United States Patent
Ning et al.

(10) Patent No.: US 12,534,380 B2
(45) Date of Patent: Jan. 27, 2026

(54) CORE-SHELL STRUCTURE TYPE WAVE ABSORBING MATERIAL, PREPARATION METHOD THEREFOR, AND APPLICATION

(71) Applicant: Ningbo Institute of Materials Technology & Engineering, Chinese Academy of Sciences, Ningbo (CN)

(72) Inventors: Mingqiang Ning, Ningbo (CN); Qikui Man, Ningbo (CN); Guoguo Tan, Ningbo (CN); Shuwen Chen, Ningbo (CN); Runwei Li, Ningbo (CN)

(73) Assignee: NINGBO INSTITUTE OF MATERIALS TECHNOLOGY & ENGINEERING, CHINESE ACADEMY OF SCIENCES, Ningbo (CN)

( * ) Notice: Subject to any disclaimer, the term of this patent is extended or adjusted under 35 U.S.C. 154(b) by 1055 days.

(21) Appl. No.: 17/626,115

(22) PCT Filed: Aug. 25, 2020

(86) PCT No.: PCT/CN2020/110990
§ 371 (c)(1),
(2) Date: Jan. 10, 2022

(87) PCT Pub. No.: WO2021/068660
PCT Pub. Date: Apr. 15, 2021

(65) Prior Publication Data
US 2022/0274844 A1 Sep. 1, 2022

(30) Foreign Application Priority Data
Oct. 9, 2019 (CN) .......................... 201910954993.9

(51) Int. Cl.
*C01G 1/12* (2006.01)
*C01B 19/00* (2006.01)
*C01G 31/00* (2006.01)
*C01G 33/00* (2006.01)
*C01G 39/06* (2006.01)
*C01G 41/00* (2006.01)
*F41H 5/04* (2006.01)

(52) U.S. Cl.
CPC .............. *C01G 1/12* (2013.01); *C01B 19/007* (2013.01); *C01G 31/00* (2013.01); *C01G 33/00* (2013.01); *C01G 39/06* (2013.01); *C01G 41/00* (2013.01); *C01P 2004/34* (2013.01); *C01P 2004/62* (2013.01); *C01P 2006/90* (2013.01); *F41H 5/0457* (2013.01)

(58) Field of Classification Search
None
See application file for complete search history.

(56) References Cited

FOREIGN PATENT DOCUMENTS

| CN | 105098151 | 11/2015 |
|---|---|---|
| CN | 108390042 | 8/2018 |

OTHER PUBLICATIONS

Cheng et al. The Outside-In Approach to Construct Fe 3 O4 Nanocrystals/Mesoporous Carbon Hollow Spheres Core-Shell Hybrids toward Microwave Absorption. ACS Sustainable Chem. Eng, 1427-1435 (Year: 2018).*
Liu et al. Shape-dependent magnetic and microwave absorption properties of iron oxide nanocrystals. Materials Chemistry and Physics, 192, 339-348 (Year: 2017).*
Ning Ming-Qiang, et al., Two-Dimensional Nanosheets of MoS2: A Promising Material with High Dielectric Properties & Miscrowave Absoption Performances.
J. Nanoscale, DOI: 10.1039/C5NR04670J, 2015.

* cited by examiner

*Primary Examiner* — Tanisha Diggs
(74) *Attorney, Agent, or Firm* — Jiwen Chen; Joywin IP Law PLLC

(57) ABSTRACT

Disclosed are a core-shell structure type wave absorbing material and a preparation method therefor. The wave absorbing material has a core-shell structure with two-dimensional transition metal-chalcogen compound nanosheets as cores and hollow carbon spheres as shells. The preparation method includes: dissolving the hollow carbon spheres in a solvent, sequentially adding a transition metal source and a chalcogen source, taking a solvothermal reaction after dissolution through stirring, and then performing posttreatment to obtain the wave absorbing material. The present invention further discloses an application of the wave absorbing material in fields of military and civilian high-frequency electromagnetic compatibility and protection. The core-shell structure type wave absorbing material of the present invention has a density of 0.3 to 1.5 g/cm$^3$, a maximum reflection loss value and an effective bandwidth of the material can be effectively improved in a frequency range of 2 to 40 GHz, and the core-shell structure type wave absorbing material is an electromagnetic compatibility and protection material capable of meeting requirements of civilian high-frequency electronic devices and military weapons and equipment such as airships and artillery shells.

8 Claims, 5 Drawing Sheets

CORE-SHELL STRUCTURE TYPE WAVE ABSORBING MATERIAL, PREPARATION METHOD THEREFOR, AND APPLICATION

This is a U.S. national stage application of PCT Application No. PCT/CN2020/110990 under 35 U.S.C. 371, filed Aug. 25, 2020 in Chinese, claiming priority to Chinese Patent Applications No. 201910954993.9, filed Oct. 9, 2019, all of which are hereby incorporated by reference.

FIELD OF TECHNOLOGY

The present invention relates to the field of electromagnetic wave absorbing materials, and more particularly relates to a core-shell structure type wave absorbing material, a preparation method therefor and an application.

BACKGROUND TECHNOLOGY

With the rapid development of information technology, electromagnetic wave (EMW) absorbing materials closely related to environmental security, information security and national defense construction are gradually becoming research hotspots, and various novel electromagnetic wave absorbing materials covering metallic materials, inorganic non-metallic materials, polymer materials and composite materials continuously appear.

Among them, due to the excellent lightweight and excellent mechanical properties, carbon materials have been widely researched and applied in the field of microwave absorption since the 1940s. However, the problem of impedance mismatch caused by its high conductivity has troubled many scientific researchers and has not been solved successfully for a long time. Layered transition metal sulfides (TMDs), typically represented by molybdenum disulfide ($MoS_2$) and tungsten disulfide ($WS_2$), have unique advantages in aspects of specific surface area and electrical properties, and thus have been widely researched in the fields such as energy storage, catalysis and lubrication in recent years.

In recent years, TMDs have gradually attracted attention in the field of dielectric wave absorption. By taking $MoS_2$ as a representative, the inventor first investigated and reported the dielectric wave absorbing performance of $MoS_2$ nanosheets prepared by an exfoliation strategy in 2015, and made an intuitive comparison with the $MoS_2$ bulk counterpart (Ning et.al. Two-dimensional nanosheets of $MoS_2$: a promising material with high dielectric properties and microwave absorption performance, Nanoscale, 2015, 7, 15734-15740). The experiment results showed that the dielectric values of the $MoS_2$ nanosheets was twice of that of $MoS_2$ bulk materials, this is mainly because of the increase of the specific surface area and metal conductive phase during the preparation process of the $MoS_2$ nanosheets and the introduction of Mo and S vacancy defect dipoles. When the $MoS_2$ nanosheets were employed as microwave absorber, a maximum reflection loss (RL) was −38.4 dB, and an effective absorption bandwidth (EAB) was 4.1 GHz, and these two indexes were both obviously superior to those of the $MoS_2$ bulk counterpart. However, when $MoS_2$ nanosheets were used as microwave absorber, a filling concentration was relatively high, thus resulting a relatively high coating density, and this limited the further development of the $MoS_2$ nanosheets in the field of microwave absorption applications. Based on this work, many research groups have reported magnetic wave absorbing material systems (such as $MoS_2$ nanosheets/carbonyl iron, $WS_2$ nanosheets/$Fe_3O_4$, $MoS_2$ nanosheets/CdS, $MoS_2$ nanosheets/rGo, etc.) and has achieved boosted EMW absorbing performance.

For example, the patent application with the publication number CN107286907A discloses a core-shell structure type molybdenum disulfide/carbonyl iron composite EMW absorber The wave absorbing material used carbonyl iron as cores and molybdenum disulfide nanopowder coated on the carbonyl iron to form a core-shell structure. When the matching thickness was 1.9 to 3.3 mm, the maximum RL over 2-18 GHz is −46 dB to −59 dB, and the EAB is 1.71 GHz. However, the density of carbonyl iron was high (7.8 $g/cm^3$). As a result, the density of formed EMW absorber was high. Additionally, the patent with the publication number CN105883921A also discloses a 3D type molybdenum disulfide nano-microsphere wave absorbing material with wide frequency band and strong wave absorbing ability. The wave absorbing material endows the maximum RL of −46.8 dB and −33.2 dB in frequency bands of 18-26.5 GHz and 26.5-40 GHz. However, the matching thicknesses were still as high as 7.5 mm and 8 mm, respectively.

Therefore, it can be seen that the current composite wave absorbing material system still has problems, such as uneven distribution of wave absorbing agents, poor impedance matching, large coating thickness, and the requirements of thin appearance, light weight, wide band and strong wave absorption ability of the wave absorbing material have still not been truly met.

SUMMARY OF THE INVENTION

The object of the present invention is to provide a method for growing a core-shell structure type wave absorbing material of a low-layer-number and high-specific-area two-dimensional transition metal-chalcogen compound nanosheets inside hollow carbon spheres through a solvothermal reaction. An impedance matching thickness of a wave absorbing agent is greatly reduced, impedance matching characteristics of the material are optimized, and a maximum RL value of the material is improved.

The present invention adopts the following technical solution:

In a first aspect, the present invention provides a core-shell structure type wave absorbing material having a core-shell structure with two-dimensional transition metal-chalcogen compound nanosheets (TMDs) as cores and hollow carbon spheres (HCS) as shells. The transition metal is selected from Sc, Ti, V, Cr, Mn, Fe, Co, Ni, Zr, Nb, Mo, Hf, Ta, W and Re, and the chalcogen is selected from S, Se and Te.

A chemical formula of a transition metal-chalcogen compound is $MX_2$, wherein M is a transition metal element, and X is a chalcogen.

In an aspect of components, the present invention performs structure assembly on two kinds of materials with obvious dielectric loss: hollow carbon spheres and two-dimensional transition metal-chalcogen compound nanosheets, so that the obtained composite material has the characteristics of lightweight and high wave absorption efficiency. In an aspect of structure, the present invention ingeniously designs two kinds of materials into the core-shell structure, the problem of easy agglomeration of two-dimensional transition metal sulfides is effectively solved; moreover, a net specific surface area of the material is effectively improved, and the impedance matching characteristics of the material are optimized. At the same time, the introduced low-conductivity TMDs thin sheets can introduce more effective electromagnetic wave loss sites to reduce a skin effect of the material and ensure the normal achievement of the loss capability of the material. Additionally, TMDs/carbon sphere micro interfaces introduced by the core-shell type structure are favorable for multiple reflection and absorption of electromagnetic waves.

A density of the wave absorbing material is 0.3 to 1.5 g/cm$^3$. Compared with traditional carbonyl iron with a density of 7.84 g/cm$^3$ and ferroferric oxide ($Fe_3O_4$) wave absorbing material with a density of 5.18 g/cm$^3$, the wave absorbing material of the present invention has the obvious advantage of light weight in an aspect of density.

A matching thickness of the wave absorbing material in a frequency band of 2 to 40 GHz is 0.5 to 5.0 mm, a maximum RL is −40 to 80 dB, and an EAB with a reflectivity value smaller than −10 dB is 2.5 to 12 GHz.

A mass ratio of hollow carbon sphere shell layers to the two-dimensional transition metal-chalcogen compound nanosheets is 1:1 to 20, preferably 1:6 to 12.

In a second aspect, the present invention further provides a preparation method for the core-shell structure type wave absorbing material, including: dissolving the hollow carbon spheres in a solvent, sequentially adding a transition metal source and a chalcogen source, taking a solvothermal reaction after dissolution through stirring, and then performing posttreatment to obtain the wave absorbing material.

In an aspect of the preparation method, the present invention utilizes a solvent thermal method, a relative concentration of reaction precursors can be precisely controlled, the microstructure adjustment and control of a target material is facilitated, the preparation method is an effective material for preparing the core-shell structure type wave absorbing material, and the preparation of a core-shell structure type composite wave absorbing material with the characteristics of broadband and high absorption performance is further realized.

A reaction temperature of the solvothermal reaction is 180 to 230° C., and a reaction time is 10 to 35 hours.

The hollow carbon spheres have good dispersibility, and a diameter of the hollow carbon spheres is 200 to 400 nm.

Preferably, the solvent is a mixed solution of an amine reagent and an alcohol reagent, and a volume ratio of the amine reagent to the alcohol reagent is (4 to 6):1. By considering that the polarity of the reaction solvent plays a decisive role on the formation of the two-dimensional transition metal-chalcogen compound nanosheets, the polarity of the solvent can be adjusted in a larger range by adjusting the mixing ratio of the amine reagent and the alcohol reagent, and the optimum polarity of the reaction solvent is further obtained through adjustment.

The amine reagent is formamide or caprolactam, and the alcohol reagent is one or a mixture of more of methanol, ethanol and isopropanol. The adding quantity of the solvent is suitable for sufficiently dispersing the hollow carbon spheres, the transition metal source and the chalcogen source.

The transition metal source includes a sodium salt, a chloride salt or a thioammonium salt of a transition metal, and the chalcogen source includes an ammonium salt, a chloride salt or an oxide of a chalcogen.

A molar ratio of the transition metal to the chalcogen is 1:(1 to 6), preferably 1:(2 to 4).

The stirring time of the hollow carbon spheres and a mixed reagent is 0.5 to 2 hours, the stirring time after the transition metal source is added is 1 to 3 hours, and the stirring time after the chalcogen source is added is 1 to 3 hours.

The posttreatment includes: performing centrifugal separation on an obtained reaction solution, collecting precipitates, and then performing washing and drying to obtain the wave absorbing material.

A centrifugal speed of centrifugation is 8000 to 12000 rpm, and the centrifugation time is 15 to 25 minutes.

The washing refers to washing respectively with deionized water and absolute ethanol for 3 to 5 times. The drying conditions include a drying temperature of 70 to 100° C., and the drying time of 12 to 24 hours.

In a third aspect, the present invention further provides an application of the core-shell structure type wave absorbing material in fields of military and civilian high-frequency electromagnetic compatibility and protection.

Further, the present invention further provides an application of the core-shell structure type wave absorbing material in fields of stealth protection and 5G communication.

According to relevant plans such as "13th Five-year Plan on Technology and Innovation", "Outline of the National Program for Medium and Long-term Science and Technology Development (2006-2020)" and "Made in China 2025", electromagnetic materials are clearly defined as key basic materials, and higher requirements are put forward on indexes of material frequency band coverage, effective unit density and the like of high-performance electromagnetic materials and devices. In the military field, the increasingly complex electromagnetic combat environment (high frequency, broadband) requires corresponding weapons and equipment to be equipped with stronger stealth protection materials. This cannot be solved by conventional materials and electromagnetic design. It needs to be based on intrinsic properties of the materials. That is, the problem needs to be gradually solved by new materials or new physical effects. In the civilian field, by taking the fifth-generation (5G) wireless communication technology with high speed, low latency and high capacity as an example, high-frequency communication means that communication tools need to deal with challenges of higher electromagnetic coupling degree and stronger wireless channel interference. The wave absorbing material designed by the present invention can achieve relevant electromagnetic compatibility and protection on the existing 5G communication frequency bands (3.4 to 3.7 GHz, 4.8 to 5 GHz, 24.5 to 27.5 GHz, and 37.5 to 42.5 GHz) in China.

Compared with the prior art, the present invention has the following advantages:

(1) The core-shell structure type composite microwave absorbing agent of the present invention has the excellent impedance matching characteristics over 2-40 GHz. When the matching thickness is 0.5 to 5.0 mm, a maximum RL of the core-shell structure type composite microwave absorber at 2 to 40 GHz is −40 dB to −80 dB, and an EAB) at the reflection loss value smaller than −10 dB is 2.5 to 12 GHz. When the matching thickness is 2.0 mm, an effective bandwidth in the frequency band of 2 to 18 GHz is 3.6 GHz, and the maximum reflectivity is −60 dB. When the matching thickness is 1.0 mm, the EAB in the frequency band of 18 to 26.5 GHz is 6 GHz, and the maximum RL is −50 dB. When matching thickness is 0.6 mm, the EAB in the frequency band of 26.5 to 40 GHz is 10 GHz, and the maximum RL is −45 dB. Compared with a material in the prior art, the core-shell structure type wave absorbing material of the present invention has the obvious advantages in aspects of performance indexes such as the matching thickness, the maximum RL and the EAB coverage, and is hopeful to be applied in the fields of darkroom protection, 5G communication, military stealth, etc.

(2) The present invention uses the hollow carbon spheres as growth templates, and two-dimensional thin layer nanosheets grow inside the hollow carbon spheres to further form the core-shell structure type composite wave absorbing material having a core-shell structure in situ. The high-dispersibility hollow carbon spheres with uniform dimensions ensure high dispersibility of a composite material, effectively avoids the problem of agglomeration of the material, effectively improves the net specific surface area of the material at the same time, and optimizes the impedance matching characteristics of the material. At the same time, introduced low-conductivity transition metal sulfide thin sheets introduce more electromagnetic wave loss sites, effectively reduce the skin effect of the material, and ensure the normal achievement of the loss capability of the material. Additionally, TMDs/HCS micro interfaces introduced by the core-shell type structure are favorable for multi-time reflection and absorption of electromagnetic waves. Test results show that the core-shell structure type composite microwave absorbing agent can effectively expand the electromagnetic wave action frequency band, excellent impedance matching characteristics and wave absorbing performance are shown in a frequency range of 2 to 40 GHz, and the core-shell structure type composite microwave absorbing agent is an ideal high-performance microwave absorbing agent.

DESCRIPTION OF THE EMBODIMENTS

The present invention will be further described hereafter with reference to the accompanying drawings and specific embodiments, but they are not intended to limit the protection scope of the present invention. Materials and instruments used in the embodiments below were all commercially available in the market.

Embodiment 1

(1) High-dispersibility hollow carbon spheres were prepared by a Stober method (Reference: Werner Stober et.al. Controlled Growth of Monodisperse Silica Spheres in the Micron Size Range, Journal of colloid and interface science, 1968, 26, 62-69). 100 mg of prepared hollow carbon spheres (with a particle size of 250 nm) were taken and put into a 50 mL beaker. 25 mL of formamide and 5 mL of methanol were added to obtain a mixed solution through sufficient stirring for 1 hour. 2.0 g of sodium molybdate dihydrate (Na2MoO4.2H2O) and 4.0 g of thioacetamide (CH3CSCH2) were respectively weighed and sequentially added into the above mixed solution, and were respectively stirred for 2 hours for sufficient dissolution, then an obtained reaction solution was transferred to a 50 mL solvothermal reaction inner lining, the inner lining was placed into a stainless steel outer sleeve to be sealed, and reaction was performed for 24 h under the condition of 200° C.

(2) After the reaction was completed, the product was put into a centrifugal tube to be subjected to 10000 rpm high-speed centrifugation for 20 minutes, a product at the tube bottom was taken, was washed for 2 to 3 times respectively by deionized water and absolute ethanol, and was then placed into an 85° C. baking oven to be dried for 15 hours to obtain a final product, and the final product was a core-shell structure type $MoS_2$@HCS wave absorbing material.

Figure 1:
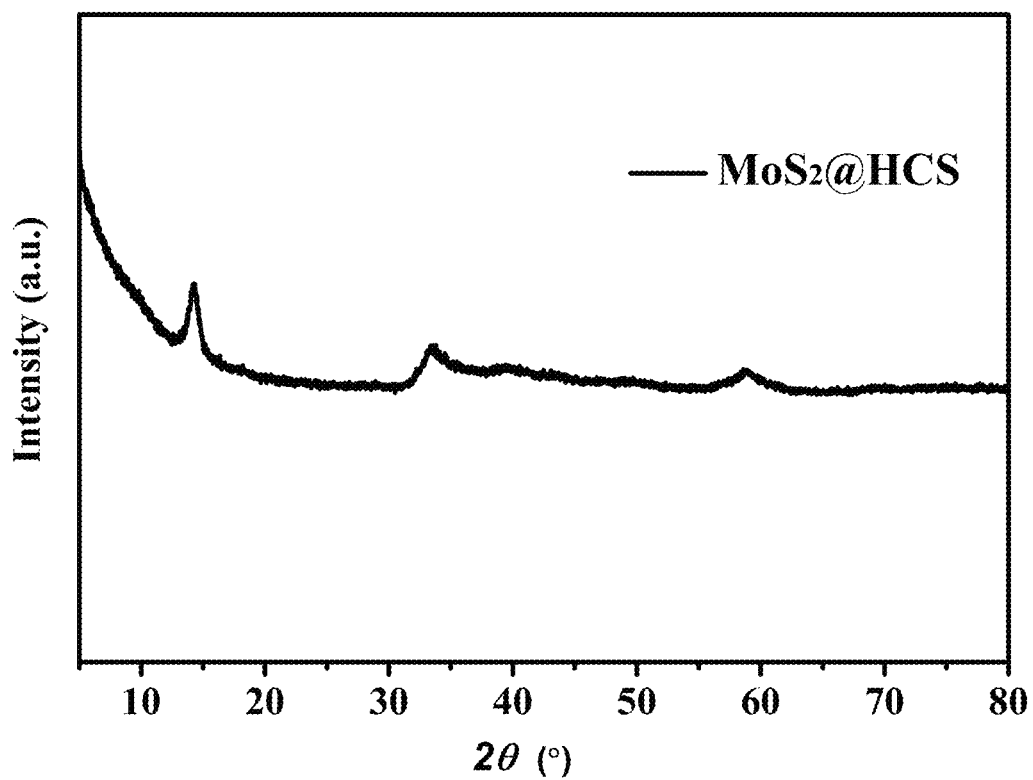
FIG. 1 is an XRD spectrum of a core-shell structure type $MoS_2$@HCS wave absorbing material prepared in Embodiment 1.

A crystal structure of the product was tested by an X-ray diffractometer (XRD, model: Bruker D8 Advance), and the result was as shown in FIG. 1. A diffraction peak at 13.5° belonged to a (002) crystal face of molybdenum disulfide, a diffraction peak at 33.5° belonged to a (100) crystal face of molybdenum disulfide, and a bulge peak at 45° belonged to a (101) crystal face of a typical carbon material. Integrally, compared with that of blocky materials, the crystal phase of the core-shell structure type $MoS_2$@HCS material prepared in Embodiment 1 had the reduced crystallinity degree, and conformed to the general characteristics of a nanometer material.

Figure 2:
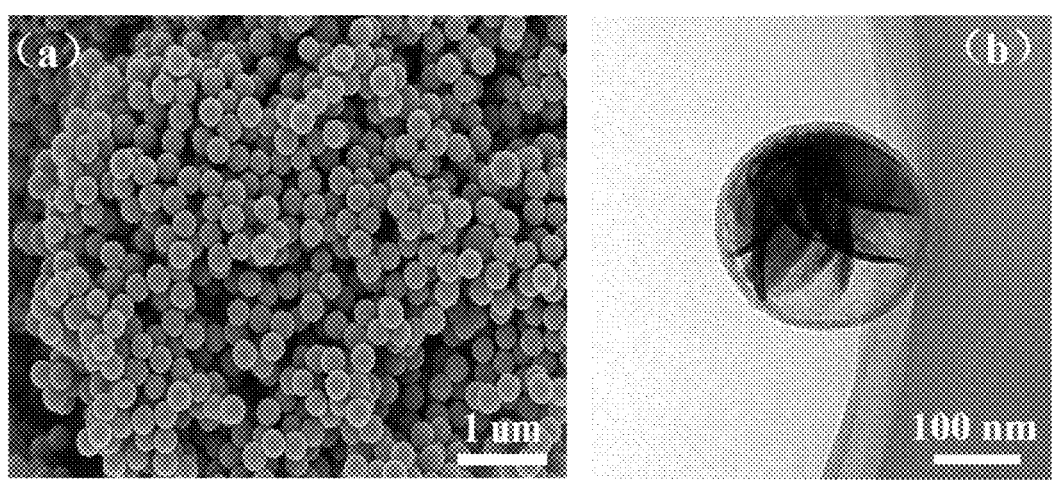
FIG. 2 is SEM and TEM images of the core-shell structure type $MoS_2$@HCS wave absorbing material prepared in Embodiment 1.

A microstructure of the material was observed by a field emission scanning electron microscope (SEM; model: Hitachi S-4800), and a result was as shown in FIG. 2(*a*). An SEM result showed that the core-shell structure type $MoS_2$@HCS material prepared in Embodiment 1 had excellent dispersibility, and an average size was 260 nm.

A core-shell structure of the material was observed by a field emission transmission electron microscope (TEM; model: FEI Tecnai G2 F20S-TWIN), and a result was as shown in FIG. 2(*b*). A TEM result showed that $MoS_2$ thin sheets were located inside the materials, the carbon spheres were used as shells, and the $MoS_2$ thin sheets and the carbon spheres formed significant core-shell structures.

Embodiment 2

Preparation steps were basically identical to those in Embodiment 1. The difference was only that sodium molybdate dihydrates in step (1) were replaced by sodium tungstate to prepare a core-shell structure type $WS_2$@HCS composite microwave absorbing agent.

Embodiment 3

Preparation steps were basically identical to those in Embodiment 1. The differences were only that sodium molybdate dihydrates in step (1) were replaced by sodium vanadate, and the thioacetamide was replaced by sodium tellurate to prepare a core-shell structure type $VTe_2$@HCS composite microwave absorbing agent.

Embodiment 4

Preparation steps were basically identical to those in Embodiment 1. The differences were only that sodium molybdate dihydrates in step (1) were replaced by sodium niobate, and the thioacetamide was replaced by sodium selenate or sodium selenite to prepare a core-shell structure type $NbSe_2$@HCS-1 wave absorbing material.

Embodiment 5

Preparation steps were basically identical to those in Embodiment 4. The difference was only that the reaction temperature in step (1) of Embodiment 4 was changed from 200° C. into 230° C., and other reaction conditions were identical to prepare a core-shell structure type $NbSe_2$@HCS-2 wave absorbing material.

Embodiment 6

Preparation steps were basically identical to those in Embodiment 4. The differences were only that the formamide in step (1) of Embodiment 4 was replaced by caprolactam, the methanol was replaced by ethanol, and other reaction conditions were identical to prepare a core-shell structure type $NbSe_2$@HCS-3 wave absorbing material.

Comparative Example 1

Preparation steps were basically identical to those in Embodiment 1. The difference was only that sodium molybdate dihydrates and thioacetamide were not added in step (1) to prepare a HCS wave absorbing material.

The wave absorbing materials prepared in Embodiments 1 to 6 and Comparative example 1 were respectively and uniformly mixed with molten paraffin according to a mass ratio of 1:1 (i.e., the content of the absorbing agents was 50%), and the mixture was prepared into a standard coaxial ring test sample with an inner diameter of 3.0 mm, an outer diameter of 7.0 mm and a thickness of 2.0 mm in a purpose-made mold. The electromagnetic wave absorption characteristics of each sample in 2 to 40 GHz were respectively tested by using a coaxial and wave guide method and utilizing a vector network analyzer (VNA; model: AgilentN5234A).

Figure 3:
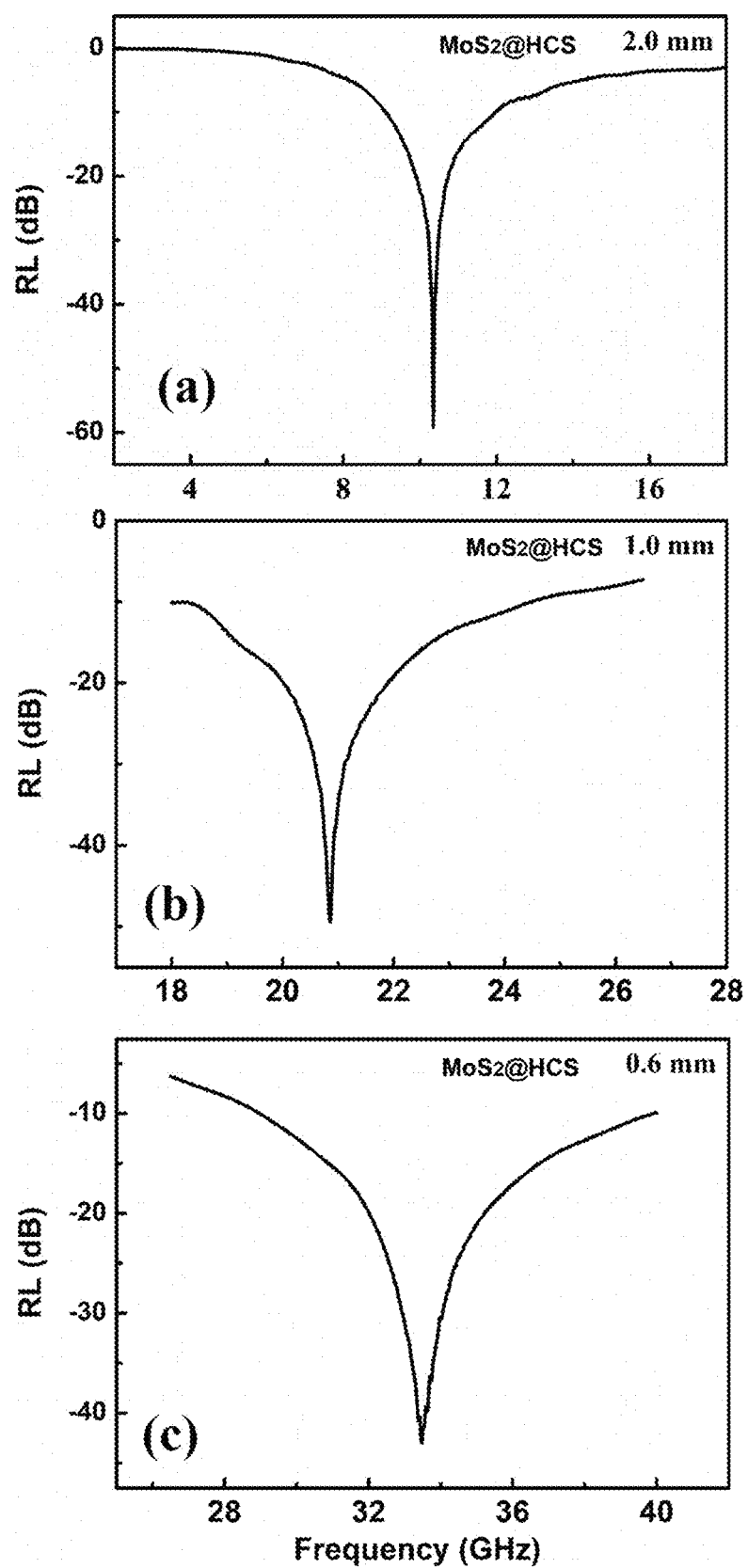
FIG. 3 is a RL spectrum of the core-shell structure type $MoS_2$@HCS wave absorbing material prepared in Embodiment 1 at a frequency band of 2 to 40 GHz.

The electromagnetic wave absorption performance of a test sample prepared from the $MoS_2$@HCS wave absorbing material according to Embodiment 1 was as shown in FIG. 3. From FIG. 3(a), it could be known that when the matching thickness was 2.0 mm, the effective bandwidth in the frequency band of 2 to 18 GHz was 3.6 GHz, and the maximum RL was −60 dB. From FIG. 3(b), it could be known that when the matching thickness was 1.0 mm, the effective bandwidth in the frequency band of 18 to 26.5 GHz was 6 GHz, and the maximum RL was −50 dB. From FIG. 3(c), it could be known that when the matching thickness was 0.6 mm, the effective bandwidth in the frequency band of 26.5 to 40 GHz was 10 GHz, and the maximum RL was −45 dB.

Figure 4:
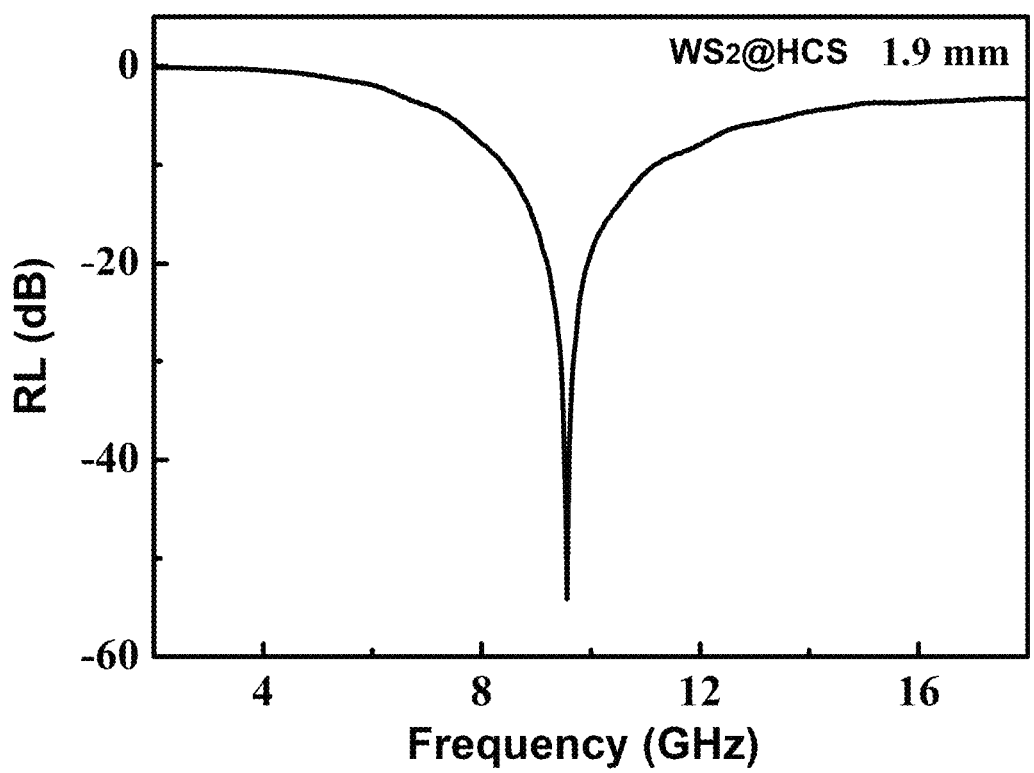
FIG. 4 is a RL spectrum of a core-shell structure type $WS_2$@HCS wave absorbing material prepared in Embodiment 2 at a frequency band of 2 to 18 GHz.

The electromagnetic wave absorption performance of a test sample prepared from the $WS_2$@HCS wave absorbing material according to Embodiment 2 was as shown in FIG. 4. From FIG. 4, it could be known that at the frequency band of 2 to 18 GHz and the matching thickness of 1.9 mm, the wave absorbing material had the maximum RL of −55 dB, and the EAB of 4 GHz.

Figure 5:
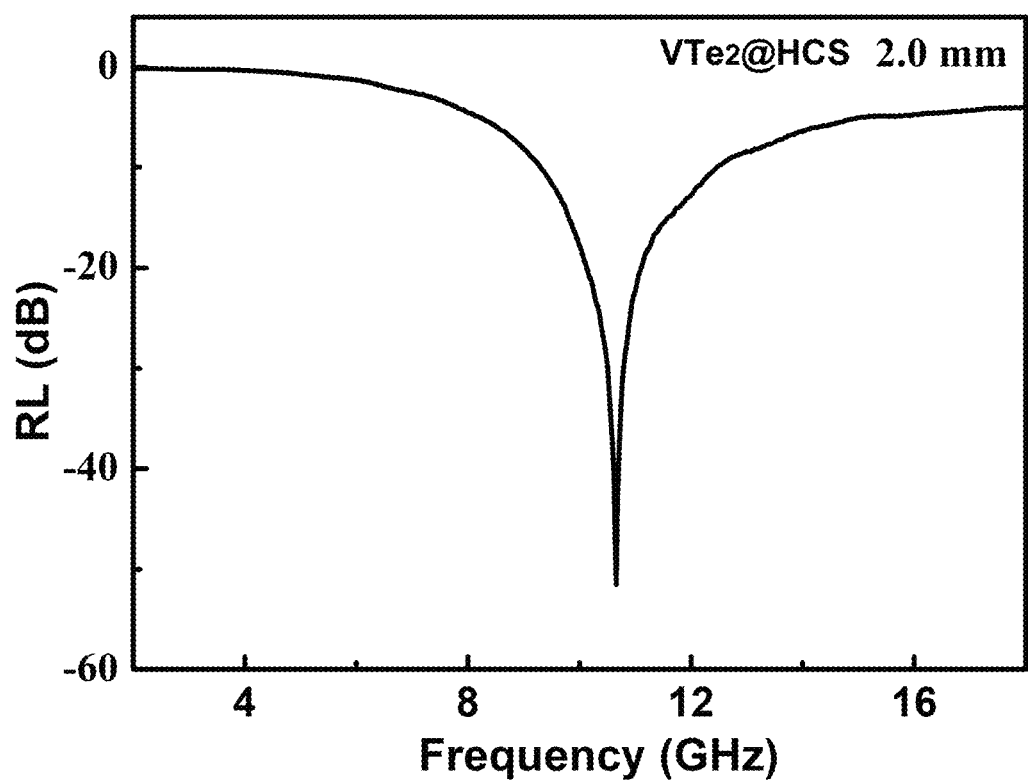
FIG. 5 is a RL spectrum of a core-shell structure type $VTe_2$@HCS wave absorbing material prepared in Embodiment 3 at a frequency band of 2 to 18 GHz.

The electromagnetic wave absorption performance of a test sample prepared from the $VTe_2$@HCS wave absorbing material according to Embodiment 3 was as shown in FIG. 5. From FIG. 5, it could be known that at the frequency band of 2 to 18 GHz and the matching thickness of 2.0 mm, the wave absorbing material had the maximum RL of −54 dB, and the EAB of 3.2 GHz.

Figure 6:
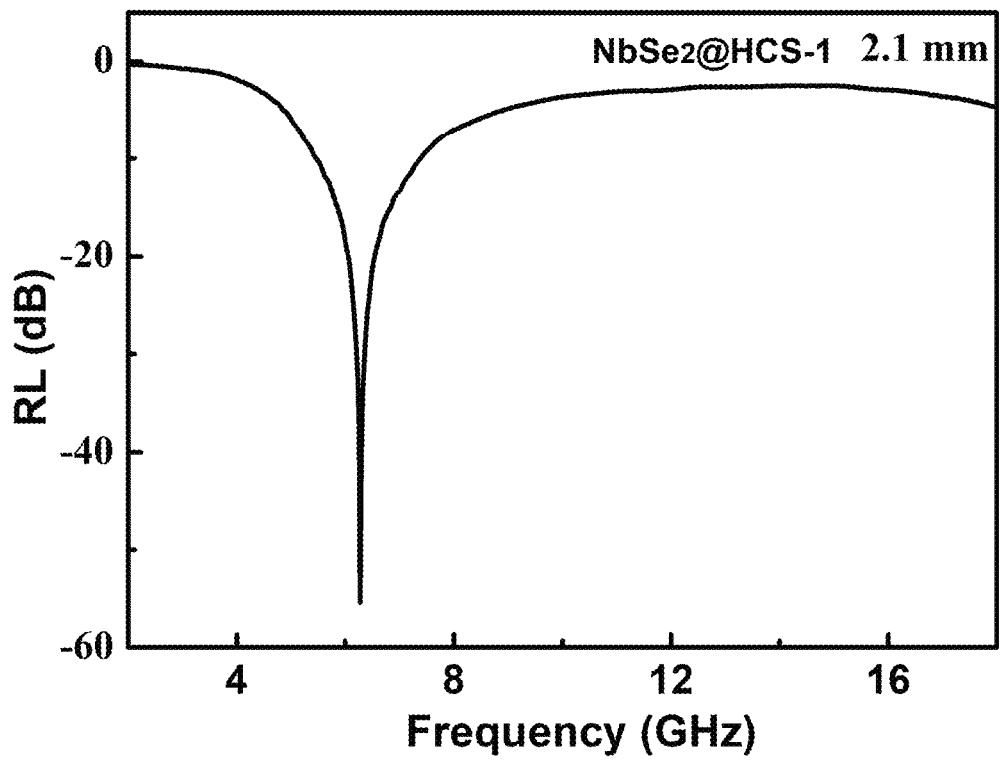
FIG. 6 is a RL spectrum of a core-shell structure type $NbSe_2$@HCS-1 wave absorbing material prepared in Embodiment 4 at a frequency band of 2 to 18 GHz.

The electromagnetic wave absorption performance of a test sample prepared from the $NbSe_2$@HCS-1 wave absorbing material according to Embodiment 4 was as shown in FIG. 6. From FIG. 6, it could be known that at the frequency band of 2 to 18 GHz and the matching thickness of 2.1 mm, the wave absorbing material had the maximum RL of −58 dB, and the EAB of 2.6 GHz.

Figure 7:
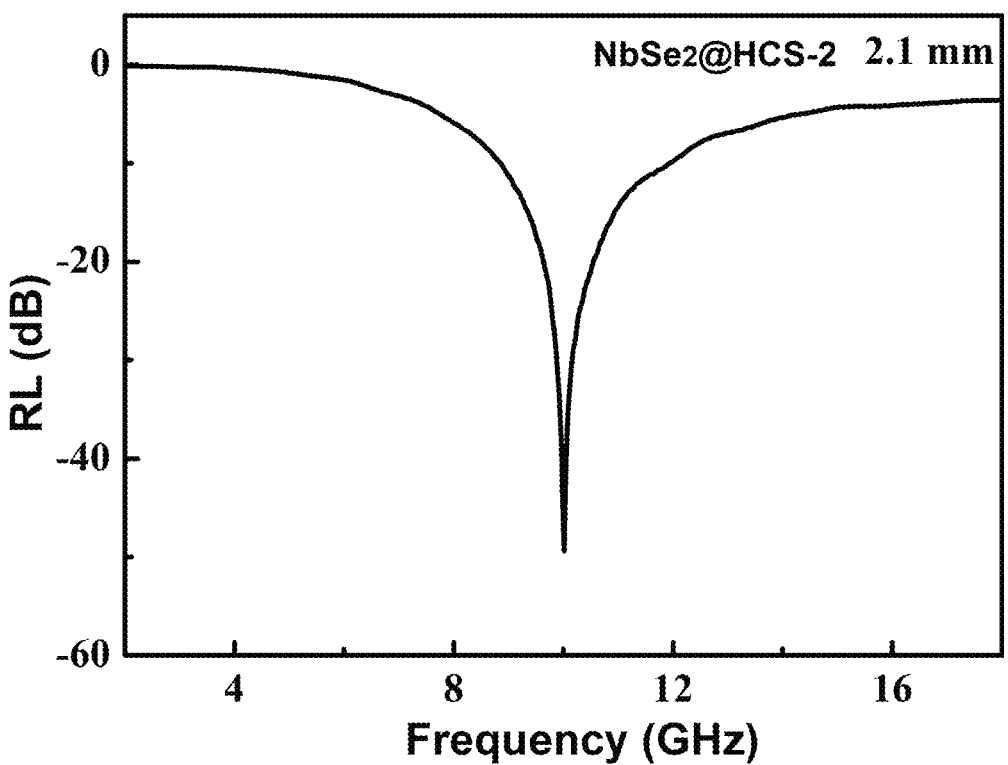
FIG. 7 is a RL spectrum of a core-shell structure type $NbSe_2$@HCS-2 wave absorbing material prepared in Embodiment 5 at a frequency band of 2 to 18 GHz.

The electromagnetic wave absorption performance of a test sample prepared from the $NbSe_2$@HCS-2 wave absorbing material according to Embodiment 5 was as shown in FIG. 7. From FIG. 7, it could be known that at the frequency band of 2 to 18 GHz and the matching thickness of 2.1 mm, the wave absorbing material had the maximum RL of −51 dB, and the EAB of 3 GHz.

Figure 8:
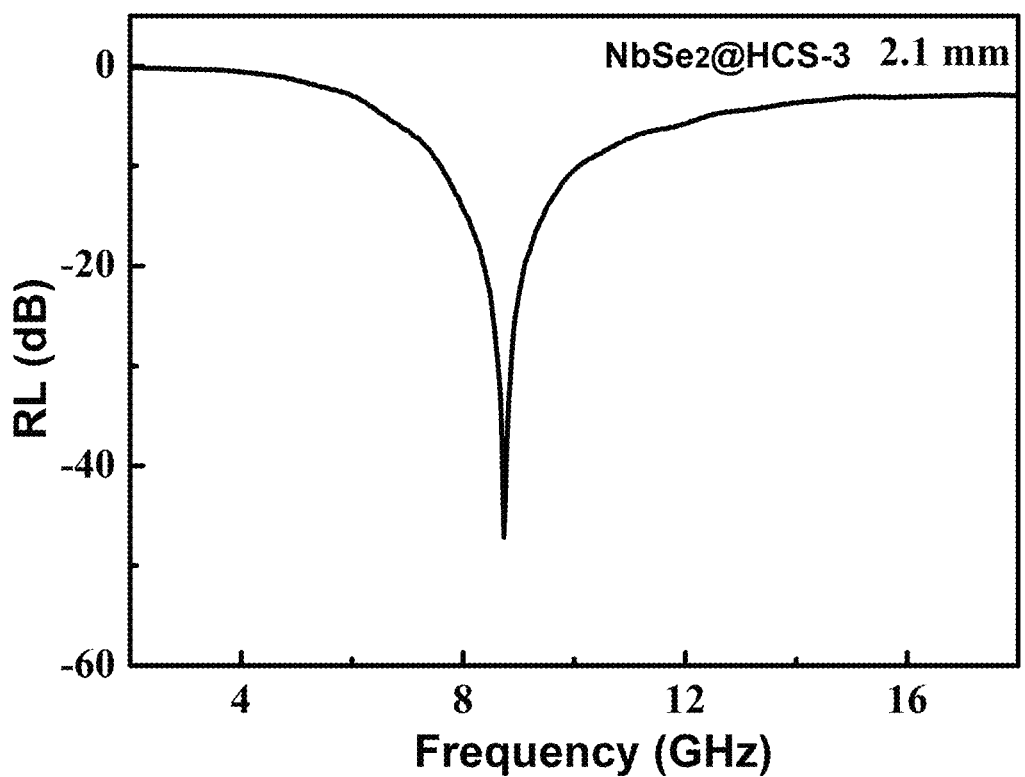
FIG. 8 is a RL spectrum of a core-shell structure type $NbSe_2$@HCS-3 wave absorbing material prepared in Embodiment 6 at a frequency band of 2 to 18 GHz.

The electromagnetic wave absorption performance of a test sample prepared from the $NbSe_2$@HCS-3 wave absorbing material according to Embodiment 6 was as shown in FIG. 8. From FIG. 8, it could be known that at the frequency band of 2 to 18 GHz and the matching thickness of 2.1 mm, the wave absorbing material had the maximum RL of −50 dB, and the EAB of 3 GHz.

Figure 9:
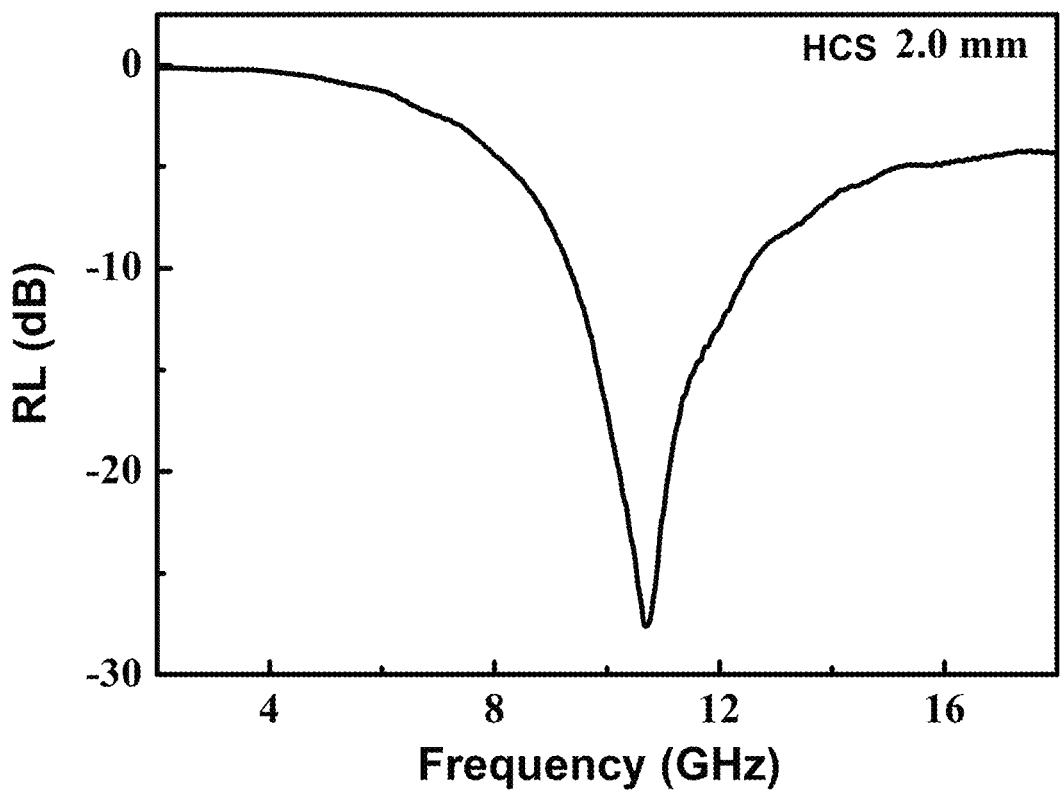
FIG. 9 is a RL spectrum of an HCS wave absorbing material prepared in Comparative example 1 at a frequency band of 2 to 18 GHz.

The electromagnetic wave absorption performance of a test sample prepared from the hollow carbon spheres according to Comparative example 1 was as shown in FIG. 9. From FIG. 9, it could be known that when the matching thickness was 2.0 mm, the maximum RL in 2 to 18 GHz was −28 dB, and the EAB was 3.0 GHz.

The above descriptions are merely typical embodiments of the present invention and are not intended to limit the present invention in any way. Anyone familiar with the art can use the methods and technical content disclosed above to make many possible changes and modifications to the solution of the present invention without departing from the technical core and solution of the present invention. Therefore, any content that does not depart from the technical solution of the present invention, and any simple changes, modifications, equivalent substitutions and equivalent changes made to the above embodiments based on the technical essence of the present invention belong to the protection scope of the technical solution of the present invention.

What is claimed is:

1. A method of absorbing electromagnetic wave in fields of military and civilian high frequency electromagnetic compatibility and protection, comprising the step of: subjecting an object to electromagnetic wave, wherein the object is provided with a core-shell structure wave absorbing material having a core-shell structure with two-dimensional transition metal-chalcogen compound nanosheets as cores and hollow carbon spheres as shells, and wherein the transition metal is selected from Sc, Ti, V, Cr, Mn, Fe, Co, Ni, Zr, Nb, Mo, Hf, Ta, W and Re, and the chalcogen is selected from S, Se and Te;

wherein a matching thickness of the wave absorbing material in a frequency band of 2 to 40 GHz is 0.5 to 5.0 mm, a maximum reflection loss (RL) is −40 to 80 dB, and an effective absorption bandwidth with a RL smaller than −10 dB is 2.5 to 12 GHz; and wherein a diameter of the hollow carbon sphere is 200 to 400 nm.

2. A method according to claim 1, wherein the core-shell structure wave absorbing material is prepared by: dissolving the hollow carbon spheres in a solvent, sequentially adding a transition metal source and a chalcogen source, taking a solvothermal reaction after dissolution through stirring, and then performing posttreatment to obtain the wave absorbing material.

3. The method according to claim 1, wherein the core-shell structure wave absorbing material is prepared by a method comprising: dissolving the hollow carbon spheres in a solvent, sequentially adding a transition metal source and a chalcogen source, taking a solvothermal reaction after dissolution through stirring, and then performing posttreatment to obtain the wave absorbing material.

4. The method according to claim 3, wherein a reaction temperature of the solvothermal reaction is 180 to 230° C., and a reaction time is 10 to 35 hours.

5. The method according to claim 3, wherein the solvent is a mixed solution of an amine reagent and an alcohol reagent, and a volume ratio of the amine reagent to the alcohol reagent is (4 to 6):1.

6. The method according to claim 5, wherein the amine reagent is formamide or caprolactam, and the alcohol reagent is one of or a mixture of of methanol, ethanol and isopropanol.

7. The method according to claim 3, wherein the transition metal source comprises a sodium salt, a chloride salt or a thioammonium salt of a transition metal, and the chalcogen source comprises an ammonium salt, a chloride salt or an oxide of a chalcogen.

8. The method according to claim 3, wherein a molar ratio of the transition metal to the chalcogen is 1:(1 to 6).

* * * * *